(12) United States Patent
Bernard et al.

(10) Patent No.: US 6,447,699 B1
(45) Date of Patent: Sep. 10, 2002

(54) ELECTRODE CONDUCTIVE MATERIAL

(75) Inventors: Patrick Bernard, Bordeaux; Claudette Audry, Bruges, both of (FR)

(73) Assignee: Alcatel, Paris (FR)

( * ) Notice: Subject to any disclaimer, the term of this patent is extended or adjusted under 35 U.S.C. 154(b) by 152 days.

(21) Appl. No.: 09/697,486

(22) Filed: Oct. 27, 2000

(30) Foreign Application Priority Data

Jul. 13, 2000 (FR) ............................................. 00 09200

(51) Int. Cl.$^7$ ............................ H01B 1/08; H01M 4/32; H01M 4/52; C01G 51/04
(52) U.S. Cl. .................... 252/521.2; 423/138; 423/140; 429/209; 429/218
(58) Field of Search ...................... 252/521.2; 423/138, 423/140, 592; 429/209, 218

(56) References Cited

U.S. PATENT DOCUMENTS 4,546,058 A   10/1985   Charkey et al.
5,965,295 A   10/1999   Bando et al.
6,379,529 B1 * 4/2002   Wahl et al. .............. 205/780.5

FOREIGN PATENT DOCUMENTS

EP   0 716 462 A1   6/1996
JP   07 320 735 A   12/1995

* cited by examiner

*Primary Examiner*—Mark Kopec
(74) *Attorney, Agent, or Firm*—Sughrue Mion, PLLC

(57) ABSTRACT

An electrode conductive material includes a non-stoichiometric oxidized cobalt compound whose electrical conductivity is greater than $5 \times 10^{-3}$ S/cm and which has a direct spinel structure and formula $Co^{2+}_x Co^{3+}_y O_4$, with $0.73 \leq x \leq 0.80$ and $1.87 \leq y \leq 1.95$. An alkaline electrolyte secondary storage cell positive electrode includes a current collector and a layer containing a binder, particles of an electrochemically active material and the aforementioned conductive material, the proportion by weight of the conductive material in the layer being from 4% to 10% of the active material.

9 Claims, No Drawings

ELECTRODE CONDUCTIVE MATERIAL

BACKGROUND OF THE INVENTION

1. Field of the invention

The present invention relates to an electrode conductive material and more particularly to the conductive material used in the positive electrode of an alkaline electrolyte secondary storage cell.

2. Description of the prior art

A non-sintered nickel electrode (also referred to as a pasted or plasticized electrode) includes a support serving as a current collector and coated with a paste containing the active material and a binder, to which a conductive material is usually added. During fabrication of the electrode a volatile solvent is added to the paste to modify its viscosity in order to facilitate shaping. When the paste has been deposited on or in the support, the combination is compressed and dried to obtain an electrode with the required density and of the required thickness.

The active material in an alkaline electrolyte storage cell positive electrode is usually a nickel-based hydroxide. Nickel hydroxide is a poor conductor and requires the addition to the electrode of a material enabling good electrical percolation. The paste therefore usually contains a conductive material, which can in particular be a cobalt compound such as metallic cobalt Co, cobalt hydroxide $Co(OH)_2$ and/or a cobalt oxide such as cobalt monoxide CoO. For example, it has been proposed to use as the conductive material a non-stoichiometric cobalt oxide with the formula $Co_xO$ where $0.93 \leq x \leq 0.97$, a cobalt oxide with the formula $CoO_x$ where $0 < x < 1$ or a cobalt monoxide CoO in which the surface of the particles is covered with hydroxyl groups or a layer of cobalt oxide with a valency at least equal to 2, such as $Co_2O_3$ or $Co_3O_4$.

When an alkaline storage cell is charged for the first time, the above substances are oxidized to form cobalt oxyhydride CoOOH in which the degree of oxidation of the cobalt is +3 or greater. Cobalt oxyhydride is stable in the normal range of operating conditions of the nickel positive electrode and insoluble in the alkaline electrolyte. It assures the electrical percolation of the electrode.

When stored in a completely discharged state, the voltage of an alkaline storage cell having a non-sintered nickel positive electrode decreases with time. If the storage time exceeds a few months, the voltage tends towards 0 V. Under these conditions the cobalt oxyhydride is reduced slowly. The degree of oxidation of the cobalt first falls to +2.66, in $Co_3O_4$, and then +2, in $Co(OH)_2$. Cobalt oxyhydride $Co(OH)_2$ is highly soluble in the electrolyte. Consequently, after a storage period of several months, a loss of conductivity is observed due to partial dissolution of the percolating network of the non-sintered electrode. This causes an irreversible loss of capacity, which can exceed 15%. This irreversible loss of capacity occurs whichever cobalt compound known in the art is introduced into the paste.

The object of the present invention is to propose a conductive material for a non-sintered nickel electrode such that the irreversible loss of capacity of the electrode in storage is greatly reduced compared to the electrodes known in the art, in combination with a high yield.

SUMMARY OF THE INVENTION

The present invention provides an electrode conductive material including a non-stoichiometric oxidized cobalt compound whose electrical conductivity is greater than $5 \times 10^{-3}$ S/cm and which has a direct spinel structure and formula $Co^{2+}_x Co^{3+}_y O_4$, with $0.73 \leq x \leq 0.80$ and $1.87 \leq y \leq 1.95$.

The above substance is isomorphic with spinel (magnesium aluminate $MgAl_2O_4$). Its structure is based on a cubic unit cell with eight face-centered oxygen lattice units. In this instance the divalent $Co^{2+}$ ions are in the tetrahedral sites of the cubic lattice, the trivalent $Co^{3+}$ ions are in the octahedral sites of the lattice, and the oxygen ions are at the apices of the tetrahedrons and the octahedrons. This structure is referred to as the "normal" or "direct" structure, as compared with the inverse structure in which the divalent and trivalent ions are disposed differently. In a structure of this type corresponding to the general formula $AB_2O_4$, there are usually twice as many trivalent ions as divalent ions. One important feature of the conductive material according to the present invention is that the cobalt oxide is non-stoichiometric, i.e. there is a cobalt deficit.

The method of fabricating an electrode conductive material according to the present invention, as previously described, includes the following steps: a basic solution made up of a mixture of potassium hydroxide KOH and sodium hydroxide NaOH is introduced into a reactor and stirred mechanically, a constant flow of oxygen is established in said solution, an initial powder containing cobalt hydroxide is introduced into said solution and left in contact with said solution, a final powder is separated from said solution, and said final powder is washed and dried.

Said solution is preferably a mixture of 6N potassium hydroxide KOH and 4N sodium hydroxide NaOH. The purpose of mechanical stirring is to take the powder up into suspension in the solution. Stirring can be obtained by means of a paddle-wheel, for example. For the reaction to be homogeneous, the flow of oxygen preferably enters the reactor from the bottom to improve the distribution of oxygen in the solution.

For example, the temperature of the solution can be from 80° C. to 120° C. and the time for which the powder is in contact with the solution can be from 5 hours to 48 hours.

In a first variant, the initial powder is cobalt hydroxide.

In another variant, the initial powder consists of particles based on nickel hydroxide covered with a layer of cobalt hydroxide.

When the reaction has taken place, the powder finally obtained is separated from the solution. The final powder is then washed, preferably with water, and then dried at moderate temperature, for example in a vacuum.

The present invention also provides an alkaline electrolyte secondary storage cell positive electrode including a current collector and a layer containing a binder, particles of an electrochemically active material and a conductive material including a non-stoichiometric oxidized cobalt compound whose electrical conductivity is greater than $5 \times 10^{+3}$ S/cm and which has a direct spinel structure and formula $Co^{2+}_x Co^{3+}_y O_4$, with $0.73 \leq x < 0.80$ and $1.87 \leq y \leq 1.95$, the proportion by weight of said conductive material in said layer being from 4% to 10% of said active material.

In a first variant, the conductive material consists of particles. In the layer containing a binder, particles of the powder conductive material are mixed with particles of said active material and the binder. Preferably the average diameter of the particles of the conductive material is less than 2 μm.

In a second variant, the conductive material consists of a coating covering the particles of the active material. The active material particles are therefore coated with a layer of the conductive material.

In a third variant, the conductive material consists of particles mixed with the particles of the active material and of a coating covering the particles of the active material.

The current collector can be a two-dimensional conductive support, such as solid or perforated strip, expanded metal, grid or woven material, or a porous three-dimensional conductive support, such as felt or foam. The support can be based on metal or carbon.

The binder includes at least one substance chosen from carboxymethylcellulose (CMC), hydroxypropylmethylcellulose (HPMC), hydroxyethylcellulose (HEC), hydroxypropylcellulose (HPC), a copolymer of styrene, ethylene, butylene and styrene (SEBS), a terpolymer of styrene, butadiene and vinylpyridine (SBVR), a copolymer of styrene and butadiene (SBR), possibly carboxylated, a copolymer of acrylonitrile and butadiene (NBR), polytetrafluoroethylene (PTFE), a fluorinated copolymer of ethylene and propylene (FEP), polyhexafluoropropylene (PPHF), polyvinylidene fluoride (PVDF), and ethylvinyl alcohol (EVA).

In a first variant the binder is a mixture of a crystalline polymer and an elastomer.

The crystalline polymer can be chosen from a fluorinated polymer, such as polytetrafluoroethylene (PTFE), a fluorinated copolymer of ethylene and propylene (FEP), polyhexafluoropropylene (PPHF), and polyvinylidene fluoride (PVDF).

The elastomer can be chosen from a copolymer of styrene, ethylene, butylene and styrene (SEBS), a terpolymer of styrene, butadiene and vinylpyridine (SBVR), a copolymer of styrene and butadiene (SBR) and a copolymer of acrylonitrile and butadiene (NBR).

In a second variant, the binder includes a first substance in the form of a fluorinated polymer and at least one second substance chosen from a cellulose compound, a fluorinated compound, an elastomer and ethylvinyl alcohol (EVA).

The fluorinated polymer can be chosen from polytetrafluoroethylene (PTFE), a fluorinated copolymer of ethylene and propylene (FEP), polyhexafluoropropylene (PPHF) and polyvinylidene fluoride (PVDF).

The cellulose compound can be chosen from carboxymethylcellulose (CMC), hydroxypropylmethylcellulose (HPMC), hydroxyethylcellulose (HEC) and hydroxypropylcellulose (HPC).

The fluorinated compound can be chosen from polytetrafluoroethylene (PTFE), a fluorinated copolymer of ethylene and propylene (FEP), polyhexafluoropropylene (PPHF), and polyvinylidene fluoride (PVDF).

The elastomer can be chosen from a copolymer of styrene, ethylene, butylene and styrene (SEBS), a terpolymer of styrene, butadiene and vinylpyridine (SBVR), a copolymer of styrene and butadiene (SBR), and a copolymer of acrylonitrile and butadiene (NBR).

In a third variant the binder is a mixture of ethylvinyl alcohol (EVA) and an elastomer.

The elastomer can be chosen from a copolymer of styrene, ethylene, butylene and styrene (SEBS), a terpolymer of styrene, butadiene and vinylpyridine (SBVR), a copolymer of styrene and butadiene (SBR), and a copolymer of acrylonitrile and butadiene (NBR).

The electrochemically active material is a nickel-based hydroxide. The expression "nickel-based hydroxide" means a hydroxide of nickel or a hydroxide containing mainly nickel, in particular a hydroxide of nickel containing at least one syncrystallized hydroxide of an element chosen from zinc (Zn), cadmium (Cd), magnesium (Mg), aluminum (Al) and cobalt (Co), and at least one syncrystallized hydroxide of an element chosen from cobalt (Co), manganese (Mn), aluminum (Al), yttrium (Y), calcium (Ca), strontium (Sr), zirconium (Zr), and copper (Cu). A syncrystallized hydroxide contained in the nickel hydroxide is a hydroxide forming a solid solution with the nickel hydroxide, i.e. one occupying in continuously variable proportions the atomic sites defined by the crystal lattice of the nickel hydroxide.

The paste can further contain at least one other substance chosen from zinc compounds such as ZnO or $Zn(OH)_2$, yttrium compounds such as $Y_2O_3$ or $Y(OH)_3$, and calcium compounds such as CaO, $Ca(OH)_2$, or $CaF_2$. The substance is usually added in powder form.

To facilitate the manufacture of the electrode, the paste can further contain a thickener, in particular a cellulose compound chosen from the sodium salt of carboxymethylcellulose (CMC), hydroxypropylmethylcellulose (HPMC), hydroxypropylcellulose (HPC) and hydroxyethylcellulose (HEC).

A positive electrode in accordance with the invention can be used in any alkaline electrolyte storage cell, for example nickel-metal hydride, nickel-cadmium, nickel-iron, nickel-zinc and nickel-hydrogen storage cells.

DETAILED DESCRIPTION OF THE PREFERRED EMBODIMENT

Other features and advantages of the present invention will become apparent on reading the following description of one embodiment of the invention.

EXAMPLE 1

An AA size sealed nickel-metal hydride (Ni-MH) secondary storage cell with a nominal capacity C of 1 200 mAh was manufactured in the following manner.

The positive electrode included a conductive support serving as a current collector in the form of a nickel foam having a porosity of approximately 95% and a paste. The paste contained an electrochemically active powder material and a conductive material in the form of an oxidized cobalt compound in the form of a powder. Its composition was as follows, in weight percent relative to the weight of the paste:

| | |
|---|---|
| electrochemically active material | 92.7% |
| conductive powder material | 6% |
| binder | 1% |
| thickener | 0.3% |

The particles of the electrochemically active material consisted of a nickel-based hydroxide. The binder was polytetrafluoroethylene (PTFE). The thickener was a sodium salt of carboxymethylcellulose (CMC). The viscosity of the paste was then modified with water. The paste was introduced into the pores of the conductive support. The combination was then dried to eliminate the water and then rolled to obtain the electrode.

The negative electrode was of a type known in the art and its electrochemically active material was an intermetallic compound capable of forming a hydride when charged. Its capacity was higher than that of the positive electrode. Each positive electrode was placed in contact with a negative electrode from which it was insulated by a separator made of a non-woven polypropylene material to form the electrochemical bundle. The bundle was wound into a spiral, inserted into a metal container and impregnated with an alkaline electrolyte in the form of an aqueous alkaline solution consisting of a mixture of 7.4N potassium hydroxide KOH, 0.5N lithium hydroxide LiOH and 0.4N sodium hydroxide NaOH.

A storage cell A was made in the manner described above in which the positive electrode contained a conductive material known in the art, namely a cobalt oxide of formula CoO which did not have a direct spinel structure.

EXAMPLE 2

A storage cell B was made in the manner described in example 1, but the positive electrode contained as the conductive material a cobalt oxide of formula $CO_3O_4$ which had a direct spinel structure but was outside the scope of the invention.

EXAMPLE 3

A storage cell C was made in the manner described in example 1, but the positive electrode contained a material of formula $Co^{2+}_{0.84}Co^{3+}_{1.98}O_4$ which was outside the scope of the invention.

EXAMPLE 4

A storage cell D was made in the manner described in example 1, but the positive electrode contained a material of formula $Co^{2+}_{0.72}Co^{3+}_{1.85}O_4$ which was outside the scope of the invention.

EXAMPLE 5

A storage cell E was made in the manner described in example 1, but the positive electrode contained a conductive material according to the present invention with the formula $Co^{2+}_{0.76}CO^{3+}_{1.88}O_4$.

The conductive material was fabricated in the following manner. 100 g of cobalt hydroxide powder were added to 1 liter of a solution containing 6N potassium hydroxide KOH and 4N sodium hydroxide NaOH. The solution was heated to a temperature of 90° C. and maintained at that temperature. The suspension was stirred with a paddle-wheel rotating at 100 rpm. A constant flow of oxygen was fed into the bottom of the reactor through a sintered glass plate. After 24 hours the suspension was filtered and the oxidized particles of cobalt hydroxide were recovered and washed in water. The particles were then dried in a vacuum at a temperature of 40° C. for 12 hours.

EXAMPLE 6

A storage cell F was made analogous to the storage cell E previously described but in which the conductive material according to the present invention with the formula $Co^{2+}_{0.76}Co^{3+}_{1.88}O_4$ was added in the form of a coating around the nickel-based hydroxide particles constituting the active material.

The conductive material was fabricated in the following manner. 100 g of a powder consisting of particles of nickel hydroxide coated with a layer of cobalt hydroxide were added to 1 liter of a solution containing 6N potassium hydroxide KOH and 4N sodium hydroxide NaOH. The solution was heated to a temperature of 90° C. and maintained at that temperature. The suspension was stirred using a paddle-wheel rotating at 100 rpm. A constant flow of oxygen was introduced into the bottom of the reactor through a sintered glass plate. After 10 hours the suspension was filtered and the oxidized particles of cobalt hydroxide were collected and washed with water. The particles were then dried in a vacuum at a temperature of 40° C. for 12 hours.

After an initial resting period of 48 hours, storage cells A to F were tested electrochemically. The irreversible loss during storage in the completely discharged state was evaluated under the following conditions:

cycle 1: charging at 0.1 lc for 16 hours at 20° C., where lc is the current needed to discharge the nominal capacity C of the cell in 1 hour, discharge at 0.21 lc to a voltage of 1 V;

cycles 2 and 3: charge at lc for 1.2 hours at 20° C., discharge at lc to a voltage of 1 V.

The storage cells A to F were stored in the discharged state at ambient temperature (20° C.) connected to a resistance of 1Ω for 3 days. After storage, the remaining capacity was measured under the following conditions.

cycles 4 to 9: charge at lc for 1.2 hours at 20° C., discharge at lc to 1 V.

The results are set out in the following table.

TABLE

| | Storage cell | | | | | |
| --- | --- | --- | --- | --- | --- | --- |
| | | | | | Invention | |
| | A | B | C | D | E | F |
| Conductivity (S/cm) | $10^{-2}$ | $4.10^{-7}$ | $6.10^{-6}$ | $3.10^{-5}$ | $2.10^{-2}$ | $2.10^{-2}$ |
| Yield on cycle 3 (mAh/g) | 240 | 175 | 185 | 190 | 240 | 247 |
| Loss of capacity in storoge (%) | 15 | 10 | 8 | 9 | 1 | 1 |

The above results show that cells B to D comprising conductive substances based on direct spinel cobalt oxide with a composition outside the scope of the invention do not provide a satisfactory electrical yield because their electrical conductivity was too low.

The conductive substances based on direct spinet cobalt oxide with compositions within the scope of the invention, used in cells E and F, provided a very low loss of capacity during storage combined with a high yield, equal to or better than that of the prior art storage cell A. The above results also show that the method of adding the conductive substance in the form of a coating around the particles of electrochemically active material provides a significant improvement in yield (+3%) compared to the method of adding it to the electrode in the form of powder.

Of course, the present invention is not limited to the embodiments described, and lends itself to many variants that will suggest themselves to the skilled person but do not depart from the scope of the invention. In particular, without departing from the scope of the invention, the composition of the hydroxide and the nature of the syncrystallized elements could be changed. Consideration could also be given to using an electrode conductive support of a different nature and structure. Finally, the various ingredients of the paste and their relative proportions could be changed. In particular, additives to facilitate forming the electrode, such as a thickener or a texture stabilizer, could be incorporated into the paste in relatively small proportions.

What is claimed is:

1. An electrode conductive material including a non-stoichiometric oxidized cobalt compound whose electrical conductivity is greater than $5 \times 10^{-3}$ S/cm and which has a direct spinel structure and formula $Co^{2+}_xCo^{3+}_yO_4$, with $0.73 \leq x \leq 0.80$ and $1.87 \leq y \leq 1.95$.

2. A method of fabricating an electrode conductive material including a non-stoichiometric oxidized cobalt compound whose electrical conductivity is greater than $5 \times 10-3$ S/cm and which has a direct spinel structure and formula $Co^{2+}_xCO^{3+}_yO_4$, with $0.73 \leq x \leq 0.80$ and $1.87 \leq y \leq 1.95$, said method including the following steps: a basic solution made up of a mixture of potassium hydroxide KOH and sodium hydroxide NaOH is introduced into a reactor and stirred mechanically, a constant flow of oxygen is established in said solution, an initial powder containing cobalt hydroxide is introduced into said solution and left in contact with said solution, a final powder is separated from said solution, and said final powder is washed and dried.

3. The method claimed in claim 2 wherein said initial powder is cobalt hydroxide.

4. The method claimed in claim 2 wherein said initial powder consists of particles based on nickel hydroxide covered with a layer of cobalt hydroxide.

5. An alkaline electrolyte secondary storage cell positive electrode including a current collector and a layer containing a binder, particles of an electrochemically active material and a conductive material including a non-stoichiometric oxidized cobalt compound whose electrical conductivity is greater than $5 \times 10^{-3}$ S/cm and which has a direct spinel structure and formula $Co^{2-}_xCo^{3+}_yO_4$, with $0.73 \leq x \leq 0.80$ and $1.87 \leq y \leq 1.95$, the proportion by weight of said conductive material in said layer being from 4% to 10% of said active material.

6. The electrode claimed in claim 5 wherein said conductive material is in the form of particles.

7. The electrode claimed in claim 6 wherein the average diameter of the particles of said conductive material is less than 2 $\mu$m.

8. The electrode claimed in claim 5 wherein said conductive material is in the form of a coating covering the particles of said active material.

9. The electrode claimed in claim 5 wherein said conductive material is both in the form of particles mixed with particles of said active material and in the form of a coating covering the particles of said active material.

* * * * *